United States Patent
Hsu

(10) Patent No.: US 9,985,514 B2
(45) Date of Patent: May 29, 2018

(54) DAMPER AND AN ELECTRICAL ENERGY CONVERTING DEVICE USING THE SAME

(71) Applicants: Fu-Tzu Hsu, Taipei (TW); Chieh-Sen Tu, New Taipei (TW)

(72) Inventor: Fu-Tzu Hsu, Taipei (TW)

(73) Assignees: Fu-Tzu Hsu, Taipei (TW); Chieh-Sen Tu, New Taipei (TW)

( * ) Notice: Subject to any disclaimer, the term of this patent is extended or adjusted under 35 U.S.C. 154(b) by 0 days. days.

(21) Appl. No.: 15/708,290

(22) Filed: Sep. 19, 2017

(65) Prior Publication Data

US 2018/0109172 A1    Apr. 19, 2018

(30) Foreign Application Priority Data

Oct. 19, 2016    (TW) .............................. 105133647 A

(51) Int. Cl.
*H02M 7/44* (2006.01)
*H02M 1/00* (2006.01)
*H02M 7/04* (2006.01)

(52) U.S. Cl.
CPC .............. *H02M 1/00* (2013.01); *H02M 7/44* (2013.01); *H02M 7/04* (2013.01); *H02M 2001/0048* (2013.01)

(58) Field of Classification Search
CPC . H02M 2001/0048; H02M 2007/4811; H02M 2007/4815; H02M 2007/4818; H02M 7/4807; H02M 7/04; H02M 7/043; H02M 7/155; H02M 7/1555; H02M 7/162; H02M 7/1623; H02M 7/44; H02M 5/40; H02M 5/45; H02M 5/458; H02M 3/335; H02M 3/33592
See application file for complete search history.

(56) References Cited

U.S. PATENT DOCUMENTS

| | | | |
|---|---|---|---|
| 6,370,050 B1* | 4/2002 | Peng | H02M 3/33576 363/17 |
| 9,048,756 B2* | 6/2015 | Dong | H02M 7/797 |
| 2010/0080028 A1* | 4/2010 | Cheng | H02M 5/4585 363/126 |
| 2012/0275201 A1* | 11/2012 | Koyama | H02M 1/126 363/40 |
| 2014/0104890 A1* | 4/2014 | Matsubara | H02M 3/33584 363/17 |
| 2014/0268899 A1* | 9/2014 | Hosotani | H02M 3/33569 363/17 |

(Continued)

*Primary Examiner* — Emily P Pham
*Assistant Examiner* — Shahzeb K Ahmad
(74) *Attorney, Agent, or Firm* — Hamre, Schumann, Mueller & Larson, P.C.

(57) ABSTRACT

A damper includes a resonant circuit, a damping capacitor unit and a switching circuit. A damping inductor unit of the resonant circuit receives alternating current (AC) electrical energy. A resonant capacitor of the resonant circuit is connected to the damping inductor unit. The switching circuit is connected to the resonant capacitor, the damping inductor unit, and the damping capacitor unit. The switching circuit establishes, when operating in a first phase, a connection between the damping inductor unit and resonant capacitor to store the AC electrical energy in the resonant circuit, and allows, when operating in a second phase, the AC electrical energy to be transferred to and stored in the clamping capacitor unit.

9 Claims, 6 Drawing Sheets

(56) References Cited

U.S. PATENT DOCUMENTS

2015/0280588 A1* 10/2015 Marrero ............ H02M 3/33546
363/21.04
2017/0331379 A1* 11/2017 Mao ........................ H02J 5/005

* cited by examiner

DAMPER AND AN ELECTRICAL ENERGY CONVERTING DEVICE USING THE SAME

CROSS-REFERENCE TO RELATED APPLICATION

This application claims priority of Taiwanese Patent Application No. 105133647, filed on Oct. 19, 2016.

FIELD

The disclosure relates to energy conversion, and more particularly to a damper and an electrical energy converting device using the same.

BACKGROUND

Energy conversion is a process of changing one form of energy to another form of energy. For energy conversion, it is important to reduce energy loss so as to increase conversion efficiency.

SUMMARY

Therefore, an object of the disclosure is to provide a damper that has improved conversion efficiency, and an electrical energy converting device using the same.

According to an aspect of the disclosure, the damper includes a resonant circuit, a damping capacitor unit and a switching circuit. The resonant circuit includes a damping inductor unit and a resonant capacitor. The damping inductor unit has a first terminal and a second terminal, and is configured to receive alternating current (AC) electrical energy. The resonant capacitor has a first terminal that is electrically connected to the first terminal of the damping inductor unit, and a second terminal. The switching circuit is electrically connected to the second terminals of the resonant capacitor and the damping inductor unit, and to the damping capacitor unit. The switching circuit is configured to operate in a first phase and a second phase. When operating in the first phase, the switching circuit establishes an electrical connection between the second terminals of the damping inductor unit and the resonant capacitor so as to store the AC electrical energy received by the damping inductor unit in the resonant circuit. When operating in the second phase, the switching circuit allows the AC electrical energy stored in the resonant circuit to be transferred to and stored in the damping capacitor unit.

According to another aspect of this disclosure, the electrical energy converting device includes a direct current (DC) to AC converter and a damper. The DC to AC converter includes a DC-AC converting circuit and an isolation transformer. The DC-AC converting circuit is configured to be electrically connected to a DC electrical energy source for receiving DC electrical energy therefrom, and converts the DC electrical energy into AC electrical energy. The isolation transformer has an input port electrically connected to the DC-AC converting circuit for receiving the AC electrical energy therefrom, and an output port. The isolation transformer outputs the AC electrical energy at the output port thereof. The damper includes a resonant circuit, a damping capacitor unit and a switching circuit. The resonant circuit includes a damping inductor unit and a resonant capacitor. The damping inductor unit has a first terminal and a second terminal, and is electrically connected to the output port of the isolation transformer for receiving the AC electrical energy therefrom. The resonant capacitor has a first terminal that is electrically connected to the first terminal of the damping inductor unit, and a second terminal. The switching circuit is electrically connected to the second terminals of the resonant capacitor and the damping inductor unit, and to the damping capacitor unit. The switching circuit is configured to operate in a first phase and a second phase. When operating in the first phase, the switching circuit establishes an electrical connection between the second terminals of the damping inductor unit and the resonant capacitor so as to store the AC electrical energy received by the damping inductor unit in the resonant circuit. When operating in the second phase, the switching circuit allows the AC electrical energy stored in the resonant circuit to be transferred to and stored in the damping capacitor unit.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
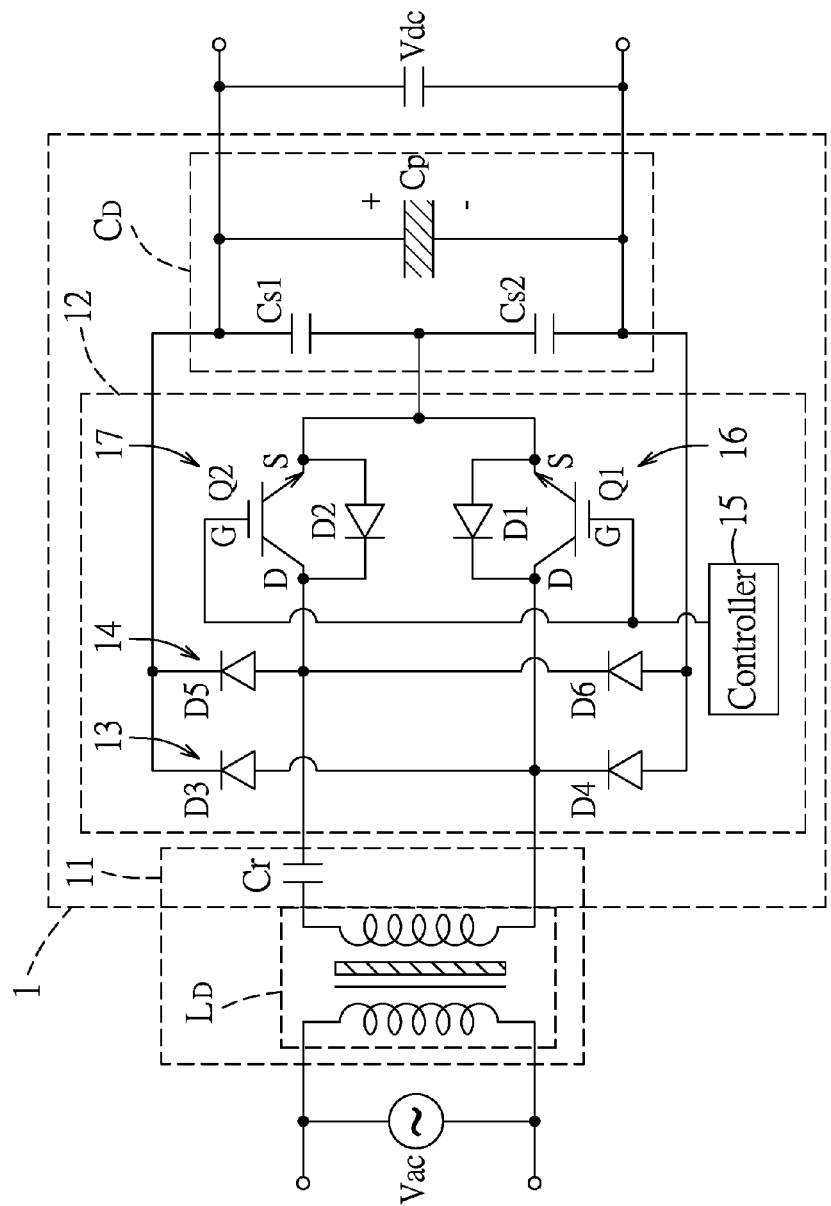
FIG. 1 is a circuit diagram illustrating an embodiment of a damper according to the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
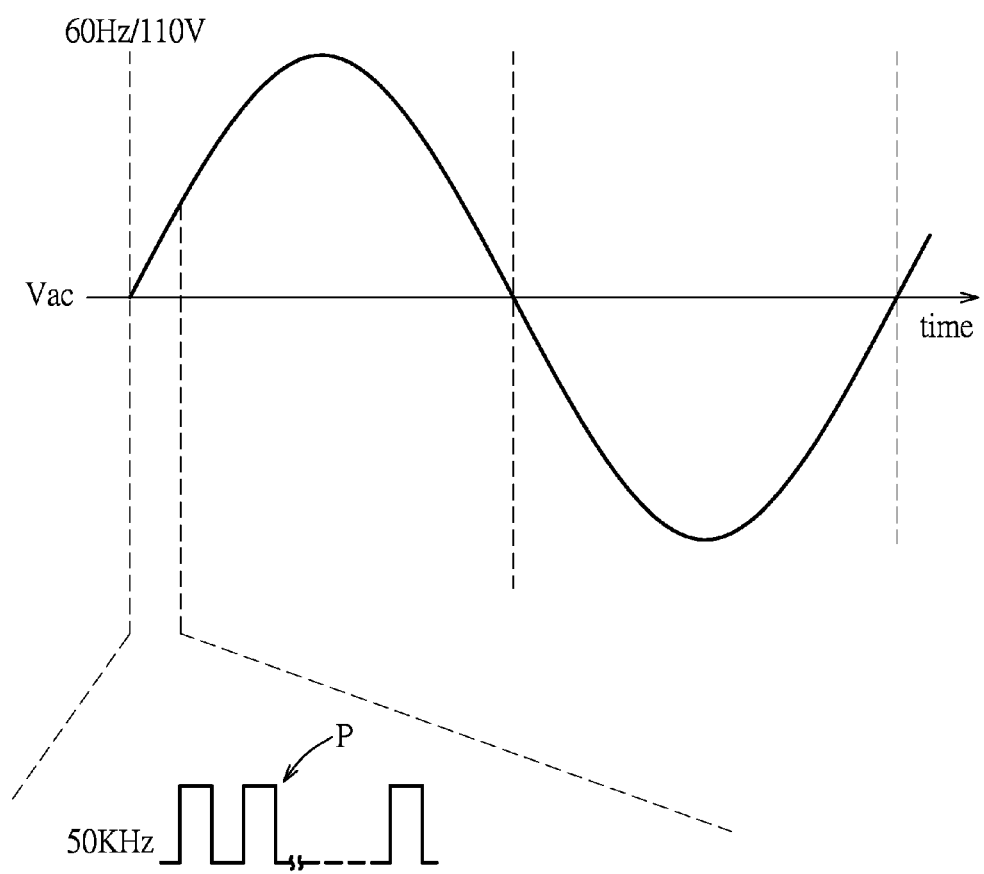
FIG. 2 is an exemplary timing diagram illustrating alternating current (AC) electrical energy and a pulse signal.

Referring to FIG. 1, an embodiment of a damper 1 of this disclosure is illustrated. The damper 1 is configured to receive alternating current (AC) electrical energy (Vac). Referring to FIG. 2, in this embodiment, the AC electrical energy (Vac) is 110 Volts in voltage and 60 Hz in frequency, but is not limited thereto.

Referring back to FIG. 1, the damper 1 includes a resonant circuit 11, a damping capacitor unit ($C_D$) and a switching circuit 12.

The resonant circuit 11 includes a damping inductor unit ($L_D$) and a resonant capacitor (Cr). The damping inductor unit ($L_D$) has a first terminal and a second terminal, and is configured to receive the AC electrical energy (Vac). Reference may be made to Taiwanese Utility Model Patent No. M470365 for details of the damping inductor unit ($L_D$), and description thereof will be omitted herein. The resonant capacitor (Cr) has a first terminal that is electrically connected to the first terminal of the damping inductor unit ($L_D$), and a second terminal.

The damping capacitor unit ($C_D$) has a first terminal, a second terminal and a third terminal. In addition, the damping capacitor unit ($C_D$) includes a first non-polarized capacitor (Cs1) connected between the first and third terminals of the damping capacitor unit ($C_D$), a second non-polarized capacitor (Cs2) connected between the second and third terminals of the damping capacitor unit ($C_D$), and a polarized capacitor (Cp) connected between the first and second terminals of the damping capacitor unit ($C_D$). For example, the polarized capacitor (Cp) has a positive terminal connected to the first terminal of the damping capacitor unit ($C_D$), and a negative terminal connected to the second terminal of the damping capacitor unit ($C_D$). The polarized capacitor (Cp) is configured to be connected in parallel with a rechargeable direct current (DC) electrical energy source (Vdc) so as to charge the same. Reference may be made to Taiwanese Utility Model Patent No. M477033 for details of the damping capacitor unit ($C_D$), and description thereof will be omitted herein.

The switching circuit 12 is electrically connected to the second terminals of the resonant capacitor (Cr) and the damping inductor unit ($L_D$), and to the damping capacitor unit ($C_D$). The switching circuit 12 is configured to operate in a first phase and a second phase When operating in the first phase, the switching circuit 12 establishes an electrical connection between the second terminals of the damping inductor unit ($L_D$) and the resonant capacitor (Cr) so as to store the AC electrical energy received by the damping inductor unit ($L_D$) in the resonant circuit 11. When operating in the second phase, the switching circuit 12 allows the AC electrical energy stored in the resonant circuit 11 to be transferred to and stored in the damping capacitor unit ($C_D$).

Specifically speaking, the switching circuit 12 includes a first diode set 13, a second diode set 14, a first switch unit 16, a second switch unit 17 and a controller 15.

The first diode set 13 is connected to the second terminal of the damping inductor unit ($L_D$) and the first and second terminals of the damping capacitor unit ($C_D$). The second diode set 14 is connected to the second terminal of the resonant capacitor (Cr) and the first and second terminals of the damping capacitor unit ($C_D$). In this embodiment, each of the first and second diode sets 13, 14 includes a first diode (D3, D5) and a second diode (D4, D6). Each first diode (D3, D5) has an anode that is connected to a corresponding one of the second terminals of the damping inductor unit ($L_D$) and the resonant capacitor (Cr), and a cathode that is connected to the first terminal of the damping capacitor unit ($C_D$). Each second diode (D4, D6) has an anode that is connected to the second terminal of the damping capacitor unit ($C_D$), and a cathode that is connected to the anode of the corresponding first diode (D3, D5). It should be noted that implementations of the diode sets 13, 14 are not limited to what are disclosed herein, and may vary in other embodiments.

The first switch unit 16 has a first terminal that is connected to the second terminal of the damping inductor unit ($L_D$), a second terminal that is connected to the third terminal of the damping capacitor unit ($C_D$), and a control terminal. The second switch unit 17 has a first terminal that is connected to the second terminal of the resonant capacitor (Cr), a second terminal that is connected to the third terminal of the damping capacitor unit ($C_D$), and a control terminal. Each of the first and second switch units 16, 17 is operable in an ON state to permit current flow therethrough between the first and second terminals thereof, and is operable in an OFF state to permit current flow therethrough from the second terminal thereof to the first terminal thereof.

Figure 3:
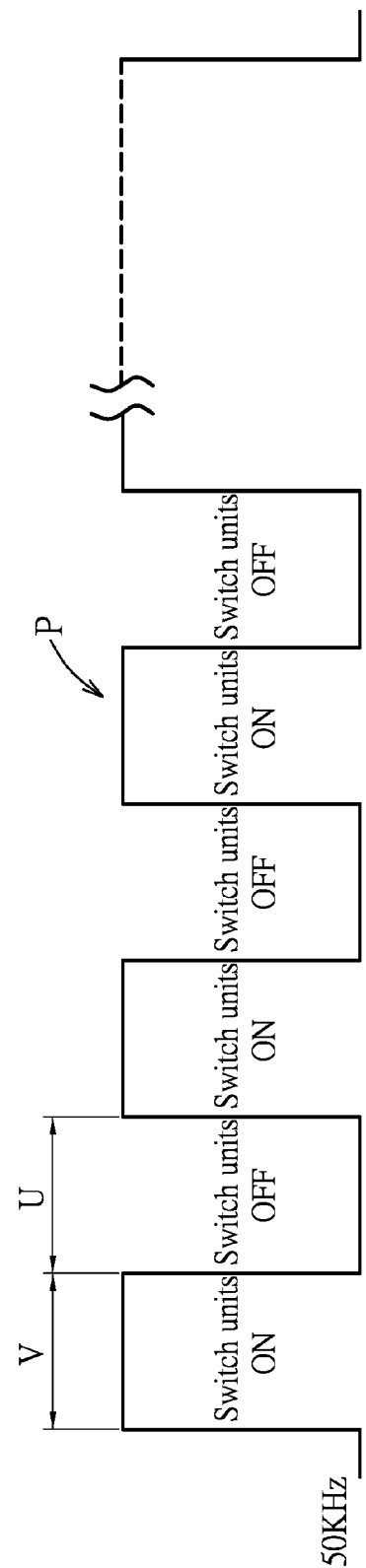
FIG. 3 is an exemplary timing diagram illustrating operation of each of switch units of the damper between an ON state and an OFF state based on the pulse signal.

The controller 15 is electrically connected to the control terminals of the first and second switch units 16, 17, and is configured to control operation of each of the first and second switch units 16, 17 between the ON state and the OFF state by a pulse signal (P) as shown in FIGS. 2 and 3. During a first time period (V) where the pulse signal (P) is at a first voltage level (e.g., a high voltage level), the first and second switch units 16, 17 are controlled to simultaneously operate in the ON state. During a second time period (U) where the pulse signal (P) is at a second voltage level (e.g., a low voltage level), the first and second switch units 16, 17 are controlled to simultaneously operate in the OFF state. In this embodiment, the pulse signal (P) is 50 KHz in frequency, but is not limited thereto.

In this embodiment, each of the first and second switch units 16, 17 includes a transistor (Q1, Q2) and a diode (D1, D2). Each transistor (Q1, Q2) (e.g., an insulated-gate bipolar transistor (IGBT)) has a drain terminal (D), a source terminal (S) and a gate terminal (G) that are respectively connected to the first, second and control terminals of the corresponding one of the first and second switch units 16, 17. When each of the first and second switch units 16, 17 operates in the ON states, the transistor (Q1, Q2) thereof conducts, such that a current can flow from the first terminal thereof to the second terminal thereof through the transistor (Q1, Q2) thereof. When each of the first and second switch units 16, 17 operates in the OFF state, the transistor (Q1, Q2) thereof does not conduct, such that a current cannot flow from the first terminal thereof to the second terminal thereof through the transistor (Q1, Q2) thereof. Each diode (D1, D2) has an anode and a cathode that are respectively connected to the second and first terminals of the corresponding one of the first and second switch units 16, 17, such that a current can flow from the second terminal of the corresponding one of the first and second switch units 16, 17 to the first terminal of the corresponding one of the first and second switch units 16, 17 through the diode (D1, D2). However, it is worth to note that implementations of the switch units 16, 17 may vary in other embodiments, and are not limited to the disclosure herein.

Figure 4:
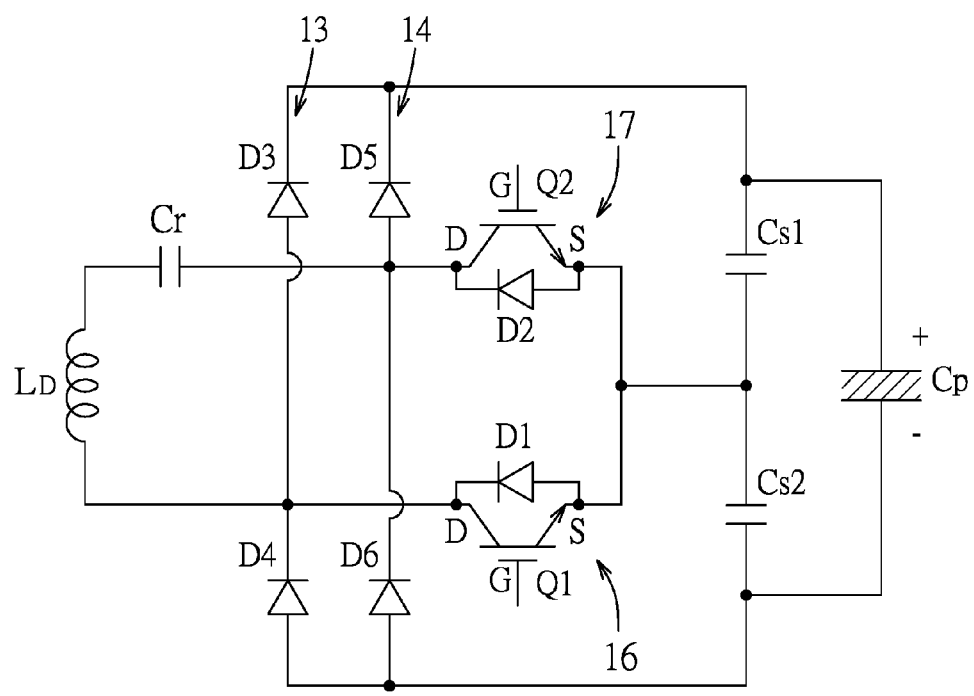
FIG. 4 is an equivalent circuit diagram illustrating the damper operating in a first phase where the switch units simultaneously operate in the ON state.
Figure 5:
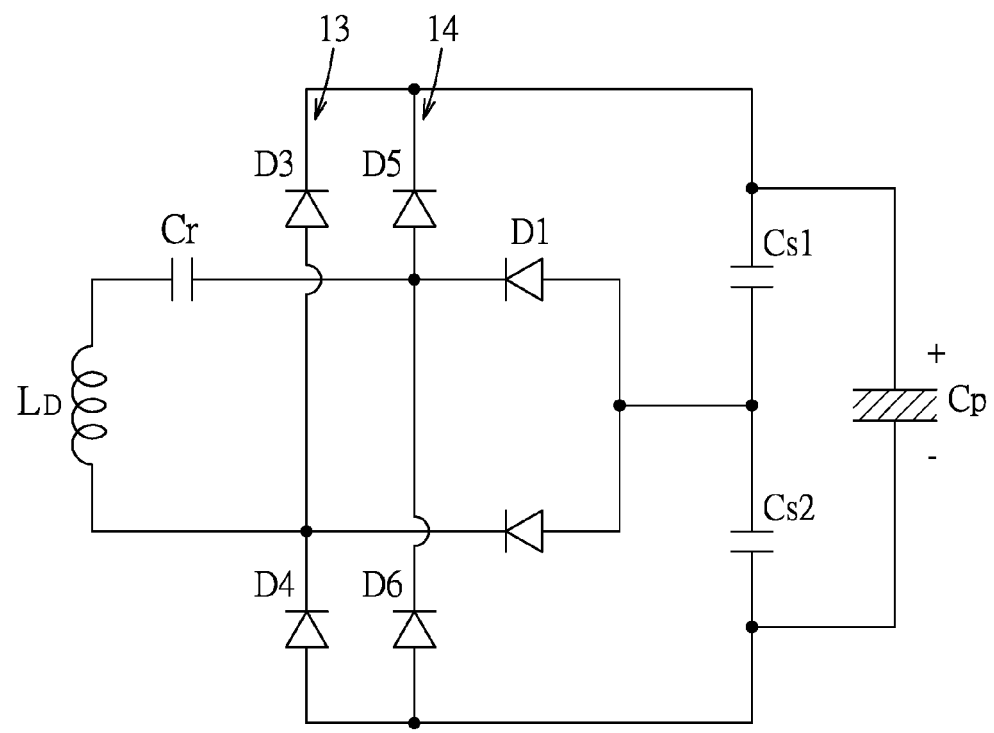
FIG. 5 is an equivalent circuit diagram illustrating the damper operating in a second phase where the switch units simultaneously operate in the OFF state.

Referring to FIGS. 3 to 5, the switching circuit 12 (see FIG. 1) operates cyclically in the first and second phases based on the pulse signal (P). In FIGS. 4 and 5, the damping inductor unit ($L_D$) is partially depicted, and the controller 15 (see FIG. 1) and the non-conducting transistors (Q1, Q2) are not depicted. As shown in FIG. 4, when the switching circuit 12 operates in the first phase, the first and second switch units 16, 17 are controlled by the controller 15 to simultaneously operate in the ON state (i.e., the transistors (Q1, Q2) simultaneously conduct) so as to establish the electrical connection between the second terminals of the damping inductor unit ($L_D$) and the resonant capacitor (Cr) (i.e., the damping inductor unit ($L_D$) and the resonant capacitor (Cr) are connected in parallel) such that the AC electrical energy received by the damping inductor unit ($L_D$) is stored in the resonant circuit 11. As shown in FIG. 5, when the switching circuit 12 operates in the second phase, the first and second switch units 16, 17 are controlled by the controller 15 to simultaneously operate in the OFF state (i.e., the transistors (Q1, Q2) simultaneously do not conduct, and the damping inductor unit ($L_D$) and the resonant capacitor (Cr) are connected in series) such that the AC electrical energy stored in the resonant circuit 11 is allowed to be transferred to and stored in the damping capacitor ($C_D$) via the first and second diode sets 13, 14 and the diodes (D1, D2).

Referring back to FIG. 1, in summary, the switching circuit 12 is controlled by the pulse signal (P) (see FIG. 3) to cyclically operate in the first phase and the second phase, such that the following are alternately performed: the AC electrical energy (Vac) received by the damping inductor unit ($L_D$) is stored in the resonant circuit 11; and the AC electrical energy stored in the resonant circuit 11 is transferred to and stored in the damping capacitor unit ($C_D$). Thereafter, the electrical energy stored in the damping capacitor unit ($C_D$) can be used to charge the rechargeable DC electrical energy source (Vdc). Consequently, energy loss is low and conversion efficiency is high.

Figure 6:
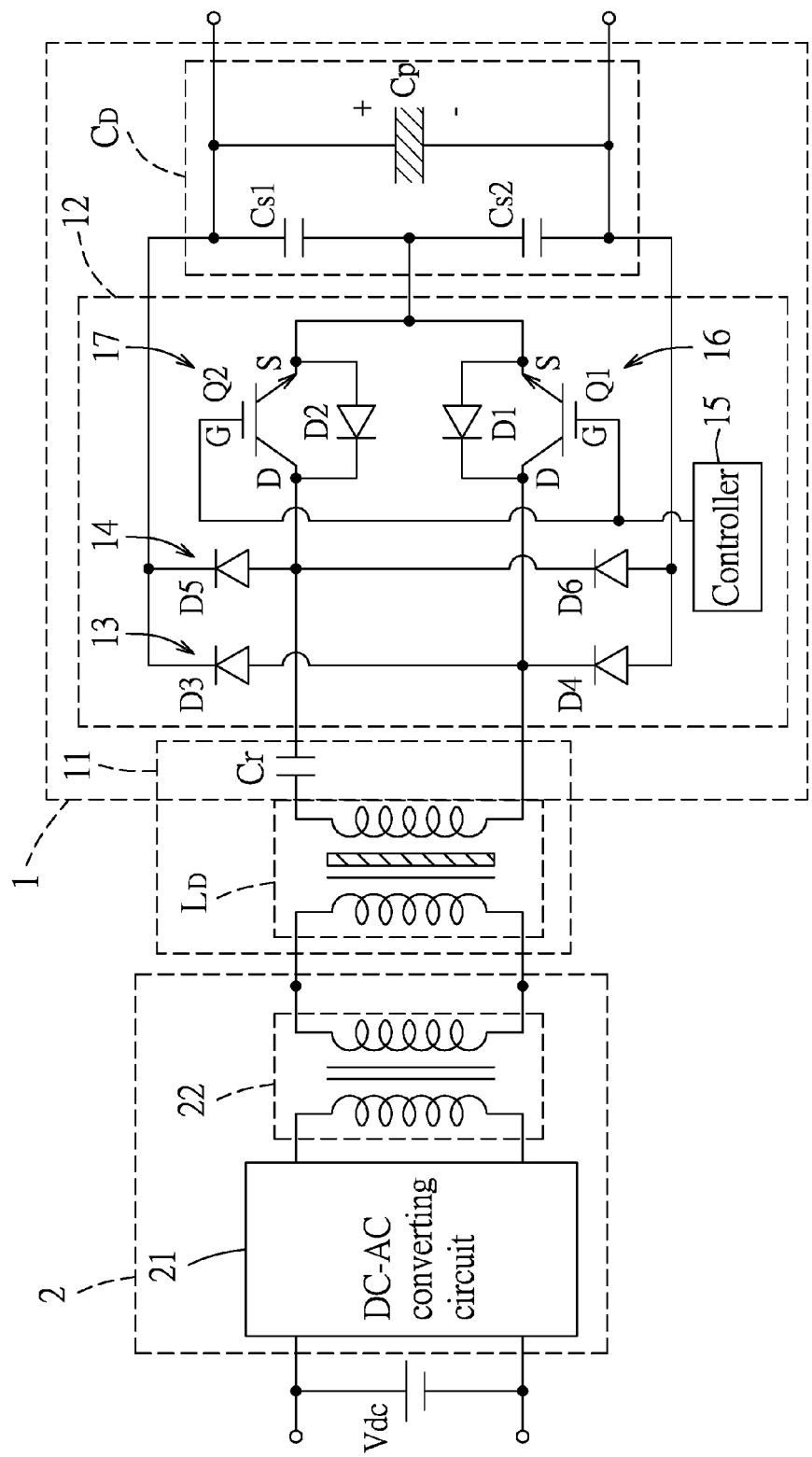
FIG. 6 is a circuit diagram illustrating an embodiment of an electrical energy converting device according to the disclosure.

Referring to FIG. 6, an embodiment of an electrical energy converting device of this disclosure is illustrated. The electrical energy converting device includes a DC to AC converter 2 and the damper 1 that is previously mentioned.

The DC to AC converter 2 includes a DC-AC converting circuit 21 and an isolation transformer 22.

The DC-AC converting circuit 21 is configured to be electrically connected to the rechargeable DC electrical energy source (Vdc) for receiving DC electrical energy therefrom, and converts the DC electrical energy into AC electrical energy.

The isolation transformer 22 has an input port electrically connected to the DC-AC converting circuit 21 for receiving the AC electrical energy therefrom, and an output port. The isolation transformer 22 outputs the AC electrical energy at the output port thereof.

In the embodiment of the electrical energy converting device, the damping inductor unit ($L_D$) of the damper 1 is configured to be connected to the isolation transformer 22 for receiving the AC electrical energy therefrom. The damping inductor unit ($L_D$) serves as a transformer when interacting with the isolation transformer 22, and serves as an inductor when interacting with the switching circuit 12. Since operations of the damper 1 have been described, details thereof will be omitted herein.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A damper comprising:
   a resonant circuit that includes
      a damping inductor unit having a first terminal and a second terminal, and being configured to receive alternating current (AC) electrical energy, and
      a resonant capacitor having a first terminal that is electrically connected to said first terminal of said damping inductor unit, and a second terminal;
   a damping capacitor unit; and
   a switching circuit that is electrically connected to said second terminals of said resonant capacitor and said damping inductor unit and to said damping capacitor unit, and that is configured to operate in a first phase and a second phase;
   wherein when operating in the first phase, said switching circuit establishes an electrical connection between said second terminals of said damping inductor unit and said resonant capacitor so as to store the AC electrical energy received by said damping inductor unit in said resonant circuit;
   wherein when operating in the second phase, said switching circuit allows the AC electrical energy stored in said resonant circuit to be transferred to and stored in said damping capacitor unit.

2. The damper as claimed in claim 1, wherein:
   said damping capacitor unit has a first terminal, a second terminal and a third terminal, and includes
      a first non-polarized capacitor connected between said first and third terminals of said damping capacitor unit,
      a second non-polarized capacitor connected between said second and third terminals of said damping capacitor unit, and
      a polarized capacitor connected between said first and second terminals of said damping capacitor unit; and
   said switching circuit includes
      a first diode set connected to said second terminal of said damping inductor unit and said first and second terminals of said damping capacitor unit,
      a second diode set connected to said second terminal of said resonant capacitor and said first and second terminals of said damping capacitor unit,
      a first switch unit having a first terminal that is connected to said second terminal of said damping inductor unit, a second terminal that is connected to said third terminal of said damping capacitor unit, and a control terminal,
      a second switch unit having a first terminal that is connected to said second terminal of said resonant capacitor, a second terminal that is connected to said third terminal of said damping capacitor unit, and a control terminal,
      each of said first and second switch units being operable in an ON state to permit current flow therethrough between said first and second terminals thereof, and being operable in an OFF state to permit current flow therethrough from said second terminal thereof to said first terminal thereof, and
      a controller electrically connected to said control terminals of said first and second switch units, and configured to control operation of each of said first and second switch units between the ON state and the OFF state.

3. The damper as claimed in claim 2, wherein:
   when said switching circuit operates in the first phase, said first and second switch units are controlled by said controller to simultaneously operate in the ON state so as to establish the electrical connection between said second terminals of said damping inductor unit and said resonant capacitor; and
   when said switching circuit operates in the second phase, said first and second switch units are controlled by said controller to simultaneously operate in the OFF state so as to allow the AC electrical energy stored in said resonant circuit to be transferred to and stored in said damping capacitor via said first and second diode sets and said first and second switch units.

4. The damper as claimed in claim 2, wherein each of said first and second switch units includes a transistor having a drain terminal, a source terminal and a gate terminal that are respectively connected to said first, second and control terminals of the corresponding one of said first and second switch units.

5. The damper as claimed in claim 4, wherein each of said first and second switch units further includes a diode having an anode and a cathode that are respectively connected to said second and first terminals of the corresponding one of said first and second switch units.

6. The damper as claimed in claim 2, wherein each of said first and second diode sets includes:
   a first diode having an anode that is connected to said second terminal of a corresponding one of said damping inductor unit and said resonant capacitor, and a cathode that is connected to said first terminal of said damping capacitor unit; and
   a second diode having an anode that is connected to said second terminal of said damping capacitor unit, and a cathode that is connected to said anode of said first diode.

7. The damper as claimed in claim 2, wherein said polarized capacitor is configured to be connected in parallel with a rechargeable direct current (DC) electrical energy source so as to charge the rechargeable direct current (DC) electrical energy source.

8. The damper as claimed in claim 1, wherein said damping inductor unit is configured to be connected to an isolation transformer for receiving the AC electrical energy therefrom, serves as a transformer when interacting with the isolation transformer, and serves as an inductor when interacting with said switching circuit.

9. An electrical energy converting device comprising:
   a direct current (DC) to alternating current (AC) converter including
      a DC-AC converting circuit that is configured to be electrically connected to a DC electrical energy source for receiving DC electrical energy therefrom, and that converts the DC electrical energy into AC electrical energy, and
      an isolation transformer that has an input port electrically connected to said DC-AC converting circuit for receiving the AC electrical energy therefrom, and an output port, and that outputs the AC electrical energy at said output port thereof; and
   a damper including a resonant circuit, a damping capacitor unit and a switching circuit;
   wherein said resonant circuit includes
      a damping inductor unit having a first terminal and a second terminal, and electrically connected to said output port of said isolation transformer for receiving the AC electrical energy therefrom, and
      a resonant capacitor having a first terminal that is electrically connected to said first terminal of said damping inductor unit, and a second terminal;
   wherein said switching circuit is electrically connected to said second terminals of said resonant capacitor and said damping inductor unit and to said damping capacitor unit, and is configured to operate in a first phase and a second phase;
   wherein when operating in the first phase, said switching circuit establishes an electrical connection between said second terminals of said damping inductor unit and said resonant capacitor so as to store the AC electrical energy received by said damping inductor unit in said resonant circuit; and
   wherein when operating in the second phase, said switching circuit allows the AC electrical energy stored in said resonant circuit to be transferred to and stored in said damping capacitor unit.

\* \* \* \* \*